(12) United States Patent
Yoshidome (10) Patent No.: US 10,674,024 B1
(45) Date of Patent: Jun. 2, 2020

(54) SCANNING APPARATUS AND SYSTEM WITH ASSISTS TO ENABLE NONMANUAL SITUATING AND SCANNING OF DOCUMENTS

(71) Applicant: Kyocera Document Solutions Inc., Osaka (JP)

(72) Inventor: Gin Yoshidome, San Ramon, CA (US)

(73) Assignee: Kyocera Document Solutions Inc., Osaka (JP)

(\*) Notice: Subject to any disclaimer, the term of this patent is extended or adjusted under 35 U.S.C. 154(b) by 0 days.

(21) Appl. No.: 16/455,361

(22) Filed: Jun. 27, 2019

(51) Int. Cl.
*G06F 3/12* (2006.01)
*H04N 1/00* (2006.01)

(52) U.S. Cl.
CPC ..... *H04N 1/00543* (2013.01); *H04N 1/00403* (2013.01); *H04N 1/00551* (2013.01); *H04N 1/00557* (2013.01); *H04N 1/00559* (2013.01); *H04N 2201/0094* (2013.01)

(58) Field of Classification Search
CPC ........... H04N 1/00543; H04N 1/00554; H04N 1/00403; H04N 1/00551; H04N 1/00557; H04N 1/00559; H04N 2201/0094
See application file for complete search history.

(56) References Cited

U.S. PATENT DOCUMENTS

| | | | |
|---|---|---|---|
| 5,040,777 A * | 8/1991 | Bell ....................... | B65H 1/025 271/105 |
| 8,348,259 B2 * | 1/2013 | Marasco .................. | B65H 1/14 271/148 |
| 10,295,942 B1 * | 5/2019 | Hashimoto .......... | G03G 15/553 |
| 2009/0316193 A1 * | 12/2009 | Kohara .............. | G03G 15/5016 358/1.15 |
| 2015/0139757 A1 * | 5/2015 | Ayash .................... | B65H 1/266 414/222.01 |

\* cited by examiner

*Primary Examiner* — Moustapha Diaby
(74) *Attorney, Agent, or Firm* — James Judge (57) ABSTRACT

An assisted scanner is ergonomically positioned in the bottom of a specially equipped MFP where the scanner is accessible to a user's feet by being housed in a housing drawer extensibly/retractably carried on slides in the bottom of the MFP. Instead of the scanner cover itself retaining a to-be-scanned document on the scanning-unit platen, the scanner cover is laterally slidable off from/onto the platen. Specially configured bar clamps as document holders, pivoting on motorized hinges, are provided flanking the platen. The document holders assume the function of pressing down on the document to retain it on the platen. The motorized hinges are voice-actuatable via a voice-user interface. The assisted scanner may be part of a system including wield-assist sandals, the sole of one, but not both, of which is coated with a low-tack adhesive whose adherence is easily breakable.

15 Claims, 11 Drawing Sheets

SCANNING APPARATUS AND SYSTEM WITH ASSISTS TO ENABLE NONMANUAL SITUATING AND SCANNING OF DOCUMENTS

BACKGROUND

Technical Field

The presently disclosed technology relates generally to scanning of documents or the like for photographic-copying reproduction or facsimile digital recording or transmission of the documents, and relates in particular to devices or arrangements for supporting or handling digital image-capture material that is in sheet form.

Description of Technological Context

A consciousness concerned with making public facilities and living and working environments more enabling for the disabled has been a fundamental of governmental policy for decades. Such consciousness has widespread parallels in the private sector. Thus, efforts to develop assistive technology have been ongoing in both corporate as well as governmental realms. The goal is to enable persons with disabilities to take advantage of and participate in home, community, school, and work environments as fully as possible. Considerable ingenuity has been dedicated to the broad range of assistive-technology devices available today, as browsing the "AbleData" website, for example, demonstrates. (The AbleData website states that its contents "were developed under a contract from the National Institute on Disability, Independent Living, and Rehabilitation Research," which is an organization administered under the U.S. Department of Health & Human Services).

Foot-powered or pedal-powered devices are well-known to everyone, as are foot-operated or pedal-operated devices. Such devices may be broadly categorized into those, such as the bicycle or paddle boat, that take advantage of the power from the muscles in the legs and feet, and those, such as the brake (and clutch) and accelerator pedals on an automobile or the foot pedals on a piano, that utilize the agility of the feet in situations where the hands and arms are otherwise preoccupied with manipulating other aspects of the device. And there are devices, such as the foot-controlled potter's kick-wheel or a pedal-operated sewing machine, that arguably utilize both the foot's muscle power as well as the foot's ability to agilely regulate the application of that power. Less common are devices that enable users for whom the dexterity of the upper limbs is not available to take advantage of the agility of the feet. Persons with upper-limb disabilities include amputees and others without arms, those with cerebral palsy who have diplegia of the arms, and others with such diplegia (bilaterally arm-paralyzed persons). One known example of a contrivance providing unconventional handsfree operation of a device, in this case a computer, is the foot-controlled mouse, or "footmouse." Not yet known, as a search on AbleData attests to, is a handsfree scanner or other device that enables wielding of scanning documents with the feet, to allow an upper-limb-challenged person to scan documents for photocopying, digitization, and related purposes.

SUMMARY

An object of the presently disclosed technology is to afford a scanner that assists nonmanual placement, and nonmanually effected retention, of a document onto the scanner's platen. A related object is to enable handsfree operation of such a scanner. A further related object is to equip a multifunction product/printer/peripheral (MFP), or like device such as a copying or printing machine with scanning functionality, with assists that enable nonmanual operation and control of such a scanner. A still further object of the presently disclosed technology is to make available a handsfree-operable scanner and associated footwear in a system for assisting foot-wielding of scanning documents into placement on the scanner, and for assisting nonmanually effected retention of a document emplaced on the scanner's platen.

An assisted scanner in accordance with the presently disclosed technology comprises a boxlike scanning-unit frame having substantially rectangular lateral sides; a scanning unit mounted in the scanning-unit frame, the scanning unit including a platen frame constituting a scanning-surface side of the scanning unit, a platen glass retained in the platen frame, scanner-cover retaining rails mounted on the platen frame along opposing sides of the platen glass, a scanner cover slidably retained on the scanner-cover retaining rails, a pair of document holders flanking the platen glass between the opposing sides of the platen glass and the scanner-cover retaining rails, the pair of document holders including a pair of document-holder arms, and a pair of hinges carrying the document-holder arms and being motorized to open the document-holder arms off of, and close document-holder arms onto, the platen frame, and scanning hardware housed in the scanning-unit frame beneath the platen glass; a scanning-hardware control unit for controlling the scanning hardware; and a voice-user interface operatively connected to the motorized hinges and to the scanning-hardware control unit.

A multifunction peripheral in accordance with the presently disclosed technology comprises an extensible and retractable scanner housing-drawer carried on ball-bearing slides provided in a bottom frame of the multifunction peripheral; and an assisted scanner, housed in the scanner housing-drawer, the assisted scanner including a boxlike scanning-unit frame having substantially rectangular lateral sides; a scanning unit mounted in the scanning-unit frame, the scanning unit including a platen frame constituting a scanning-surface side of the scanning unit, a platen glass retained in the platen frame, scanner-cover retaining rails mounted on the platen frame along opposing sides of the platen glass, a scanner cover slidably retained on the scanner-cover retaining rails, a pair of document holders flanking the platen glass between opposing sides of the platen glass and the scanner-cover retaining rails, the pair of document holders including a pair of document-holder arms, and a pair of hinges carrying the document-holder arms and being motorized to open the document-holder arms off of, and close document-holder arms onto, the platen frame; and scanning hardware housed in the scanning-unit frame beneath the platen glass; a scanning-hardware control unit for controlling the scanning hardware; and a voice-user interface operatively connected to the motorized hinges and to the scanning-hardware control unit; wherein the voice-user interface includes a microphone installed in an upper portion of the multifunction peripheral and operatively connected to the voice-user interface.

A assisted scanning system in accordance with the presently disclosed technology comprises a multifunction peripheral including an extensible and retractable scanner housing-drawer carried on ball-bearing slides provided in a bottom frame of the multifunction peripheral; and an assisted scanner, housed in the scanner housing-drawer, the assisted scanner including a boxlike scanning-unit frame having substantially rectangular lateral sides; a scanning unit mounted in the scanning-unit frame, the scanning unit including a platen frame constituting a scanning-surface side of the scanning unit, a platen glass retained in the platen frame, scanner-cover retaining rails mounted on the platen frame along opposing sides of the platen glass, a scanner cover slidably retained on the scanner-cover retaining rails, a pair of document holders flanking the platen glass between opposing sides of the platen glass and the scanner-cover retaining rails, the pair of document holders including a pair of document-holder arms, and a pair of hinges carrying the document-holder arms and being motorized to open the document-holder arms off of, and close document-holder arms onto, the platen frame; and scanning hardware housed in the scanning-unit frame beneath the platen glass; a scanning-hardware control unit for controlling the scanning hardware; and a voice-user interface operatively connected to the motorized hinges and to the scanning-hardware control unit, wherein the voice-user interface includes a microphone installed in an upper portion of the multifunction peripheral and operatively connected to the voice-user interface; and wield-assist footwear constituted by a sticky sandal whose sole is coated with a low-adhesion, low-tack, removable adhesive, and a non-sticky sandal.

From the following detailed description in conjunction with the accompanying drawings, the foregoing and other objects, features, aspects and advantages of the present invention will become readily apparent to those skilled in the art.

DETAILED DESCRIPTION

The presently disclosed technology affords special assist-equipped devices, machines, and systems enabling non-manual situating of documents on a scanner, and handsfree operation of the scanning function of the assist-equipped scanner on which a document accordingly has been non-manually situated.

In assisted scanner implementations, the presently disclosed technology affords a scanning unit mounted in a boxlike scanning-unit frame, scanning hardware housed in the scanning-unit frame, a rectangular platen-glass retaining frame constituting a scanning-surface side of the scanning unit, and on opposing sides of which are mounted scanner-cover retaining rails, a scanner cover slidably retained on the rails, and a pair of document holders flanking the platen glass between the opposing sides of the platen glass and the scanner-cover retaining rails. The document holders include document-holder arms integral with hinges motorized by a hinge-drive motor to open the document-holder arms off of, and close them onto the platen-glass retaining frame. The assisted scanner includes a scanning-hardware control unit and a voice-user interface operatively connected to the motor-driven hinge and to the scanning-hardware control unit. The scanning-unit frame may be configured to retain the scanning unit tilted at an acute angle with respect to the scanning-unit frame's substantially rectangular lateral sides. The scanner cover may be either partially or entirely made of a non-slip material having a high coefficient of friction, or its outer surface may be modified to provide it with an enhanced hold-enabling facility.

In assisted multifunction peripheral implementations, the presently disclosed technology affords an above-described assisted scanner, housed in a scanner housing-drawer that is extensibly/retractably carried on ball-bearing slides provided in a bottom frame of the multifunction peripheral, and in such implementations a microphone is installed in an upper portion of the multifunction peripheral and is operatively connected to the voice-user interface of the assisted scanner. The scanner housing-drawer may include a scanning-unit frame retaining the assisted scanner at an acute angle with respect to the ball-bearing slides. The scanner housing-drawer may be semiautomatically or automatically extensible/retractable, and in the latter case, the voice-user interface may be operatively connected to the scanner housing-drawer.

In assisted scanning system implementations, the presently disclosed technology affords an above-described multifunction peripheral in combination with wield-assist footwear constituted by a sticky sandal whose sole is coated with a low-adhesion, low-tack, removable adhesive, and a non-sticky sandal. The top of either or both the sticky sandal and the non-sticky sandal may be marked or patterned to visually distinguish the sticky from the non-sticky sandal.

Figure 1:
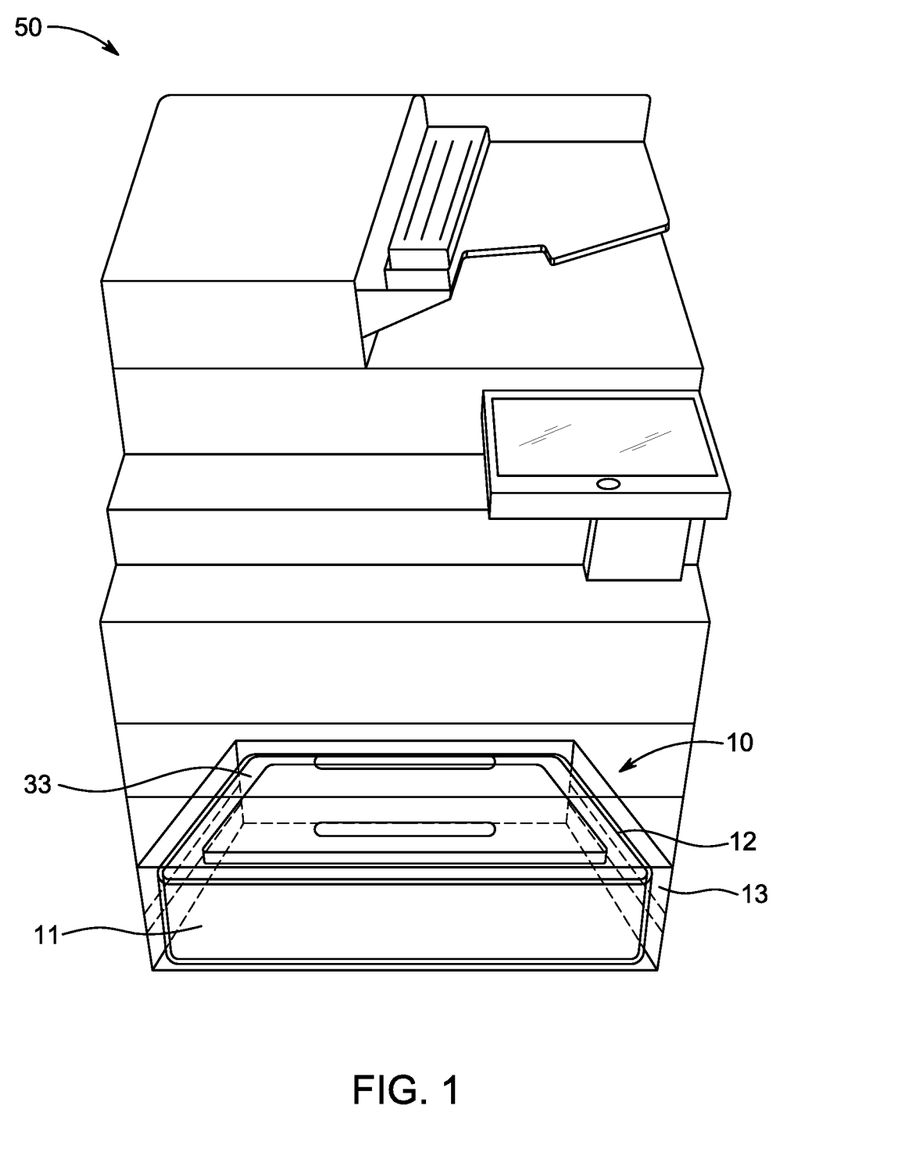
FIG. 1 depicts an assisted scanner housed in a scanner housing-drawer, in a bottom portion of an NFP.

Whereas the scanner in a conventional MFP is situated in the top of the machine—and, if the machine has one, beneath the automatic document feeder (ADF)—as represented in FIG. 1, an assisted scanner 10 of the presently disclosed technology is ergonomically positioned in the bottom of a thus specially equipped MFP 50, where it is accessible to a user's feet. The assisted scanner 10 is fundamentally constituted by a scanning unit 11 mounted in a boxlike scanning-unit frame 12 whose lateral sides are substantially rectangular. A platen frame 33 constitutes the top, scanning-surface side of the scanning unit 11. The assisted scanner 10 in the illustrated implementation is mounted in a scanner housing-drawer 13.

The extending/retracting of the scanner housing-drawer 13 may be spring-actuated. Alternatively, the scanner housing-drawer 13 may be automatically extensible/retractable via operations that are voice-actuated. That is, the scanner housing-drawer 13 may be at least semi-automatic by being at least automatically extensible via any known mechanism that stores the energy of the drawer 13 retracting by being pushed shut—here, usually by a user's foot. The energy of the scanner housing-drawer being pushed shut may be stored by loading a spring or springs via a ratcheting mechanism or may be stored into a gas spring. In such implementations, a press-to-release (single-touch release) spring-loaded latch, e.g. a mechanical or magnetic latching mechanism, holds the scanner housing-drawer 13 shut, wherein lightly pressing on the front face of the drawer 13 releases the spring-loaded latch. This releasing action could simultaneously release the ratchet-stopping pawl in implementations employing a ratcheting mechanism to store energy to slide the scanner housing-drawer 13 open automatically, or the releasing action could release a gas-spring latch in implementations employing a gas spring to likewise open the drawer 13 automatically. In the former case, the spring-loaded sliding open of the scanner housing-drawer 13 could be dampened by suitable means such as gas springs.

In implementations other than those in which the scanner housing-drawer 13 is spring-loaded to enable it being opened by a press/touch-to-release operation by a user's foot on the drawer face, the scanner housing-drawer 13 may be fully automatically extensible/retractable by known means such as a motor-driven rack-and-pinion system provided on either side of the drawer 13. In such implementations the opening/closing of the drawer 13 may be by a voice-actuated, servomotor-controlled latch.

Figure 2:
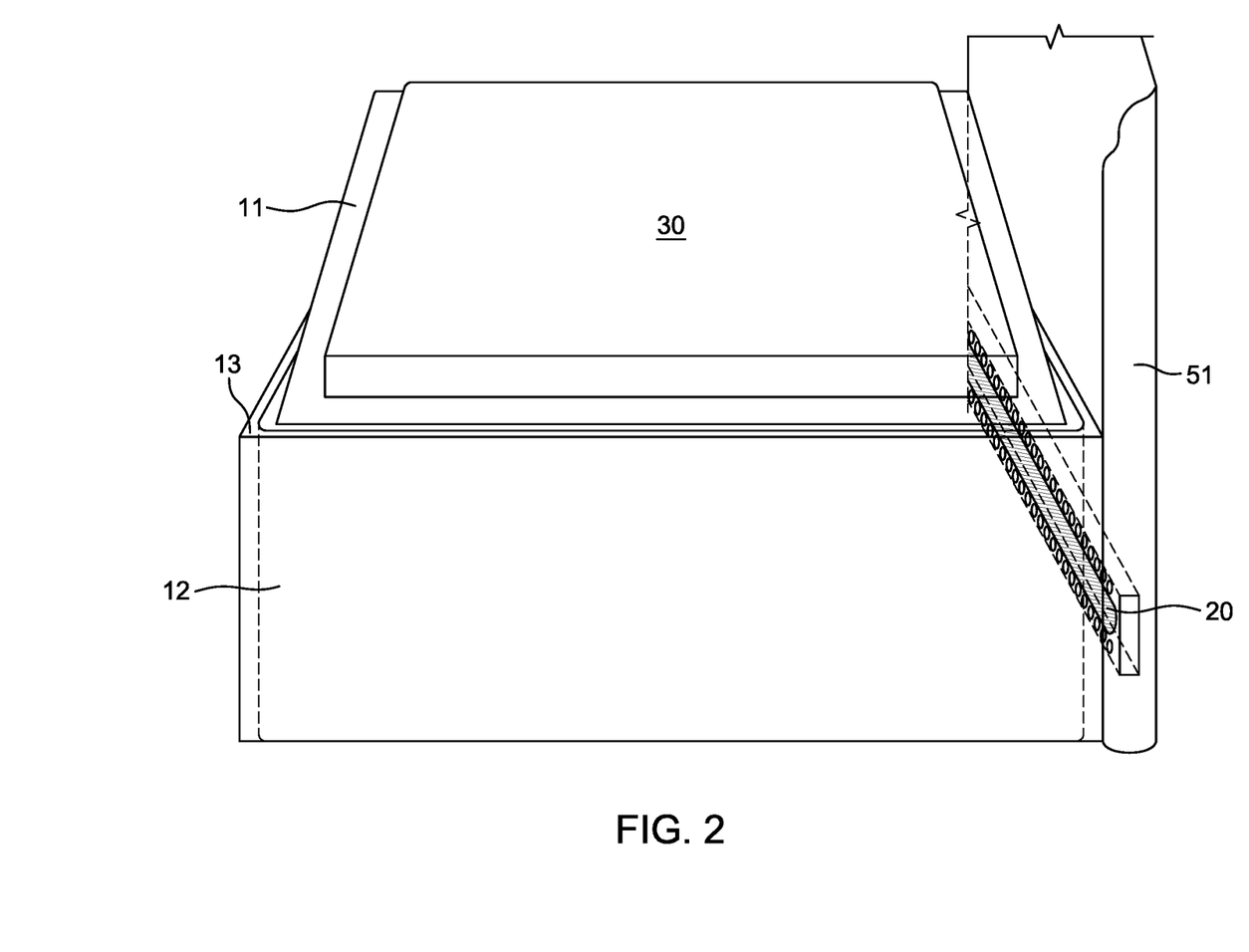
FIG. 2 is an enlarged view of the assisted scanner and scanner housing-drawer of FIG. 1, with mounting hardware for the scanner housing-drawer depicted on one of the drawer's sides, mounted to a fragmentarily depicted frame of the NFP.

In either semiautomatic-opening or fully automatic opening/closing implementations of the scanner housing-drawer 13, the drawer 13 is, as illustrated in FIG. 2, carried in the bottom part of the MFP 50 frame 51 on telescopic ball-bearing slides 20. The slides 20 include at least an outer member, and an inner member carried on ball bearings by the outer member, with the outer member typically being the drawer-slide component that is mounted onto the MFP frame 51. Such drawer slides are described, for example, in U.S. Pat. No. 6,712,435, which in its entirety is incorporated herein by reference.

A cable assembly of length sufficient to permit the extension/retraction of the scanner housing-drawer 13 connects the scanner's output electronics with the MFP's copier section, or otherwise to a known scanner-data storage device. A cable assembly likewise of sufficient length provides power to the scanning unit's optics and control circuitry, to its scanning electronics and drive motors—here collectively referred to as the scanning unit's scanning hardware—to motors driving the rack-and-pinion system in implementations employing such means for automatic extending/retracting of the scanner housing-drawer 13, as well as to voice-actuation electronics in the aforementioned implementations in which servomotor-controlled latch is employed for opening/closing of the scanner housing-drawer 13. The cable assemblies may be flexible flat cables or other ribbon cables, or wire harnesses. In certain implementations, the scanning unit 11 is configured to route the output-electronics cable assembly and the power cable assembly through the rear of the unit, so as to be out of the way of the telescopic ball-bearing slides 20 and of the extending/retracting scanner housing-drawer 13.

In certain implementations, as indicated in FIG. 2, the scanning-unit frame 12 retains the scanning unit 11 tilted at an acute angle, for example 30° to 45°, both with respect to the substantially rectangular lateral sides of the scanning unit 11, and with respect to the scanner housing-drawer 13, which itself is substantially horizontal as carried on the telescopic ball-bearing slides 20 in the bottom of the MFP 50. The scanning-unit frame 12 may be designed so that the scanning unit 11 is mounted permanently at that tilt, or the frame 12 may be designed to enable adjustment of the angle at which it retains the scanning unit 11. For example, the scanning-unit 11 may be mounted within a (not shown) subframe that is pivotably mounted within a (not shown) main frame to enable it to be pivoted to an angle of choice, in which case the subframe could be wingnut-locked into place on bolts penetrating arcuate retaining grooves in the main frame on opposite sides of the scanning unit 11, or the subframe could be pivoted to any of given angles determined by pins engaging notches in such arcuate retaining grooves.

It will be appreciated that the height of the scanner housing-drawer 13—that is, its vertical depth—must be sufficient to accommodate the scanning unit 11 as tilted in implementations in which the scanning unit 11 is mounted permanently at a tilt. The just-described scanning-unit main and sub-frames could be designed to retain the scanning unit 11 in the subframe on spring-elastic means within the mainframe, and so that when the scanner housing-drawer 13 is opened, the scanning unit 11 as mounted in the subframe swings up from its horizontal, stowed position to the tilt angle of choice.

Conventional MFPs or other scanning-function implementing machines are typically furnished with a scanner-unit cover, serving not only to keep the machine's platen glass optically clean but also to cushion-clamp a scanned document onto the platen. In a conventional MFP as exemplary of such machines, the scanning-unit cover usually is mounted on spring-loaded hinges whose spring force must be overcome by a considerable amount of manual lifting strength, especially if the cover is combined with an ADF, in order that the cover be raised off the platen. A scanning unit 11 of the presently disclosed technology, in contrast, features a sliding scanner cover that in certain implementations may be slid open off the platen by a simple operation with the foot. In other implementations a scanning unit 11 of the presently disclosed technology is enabled to draw the scanner cover off the platen automatically in response to a voice command.

Figure 3A:
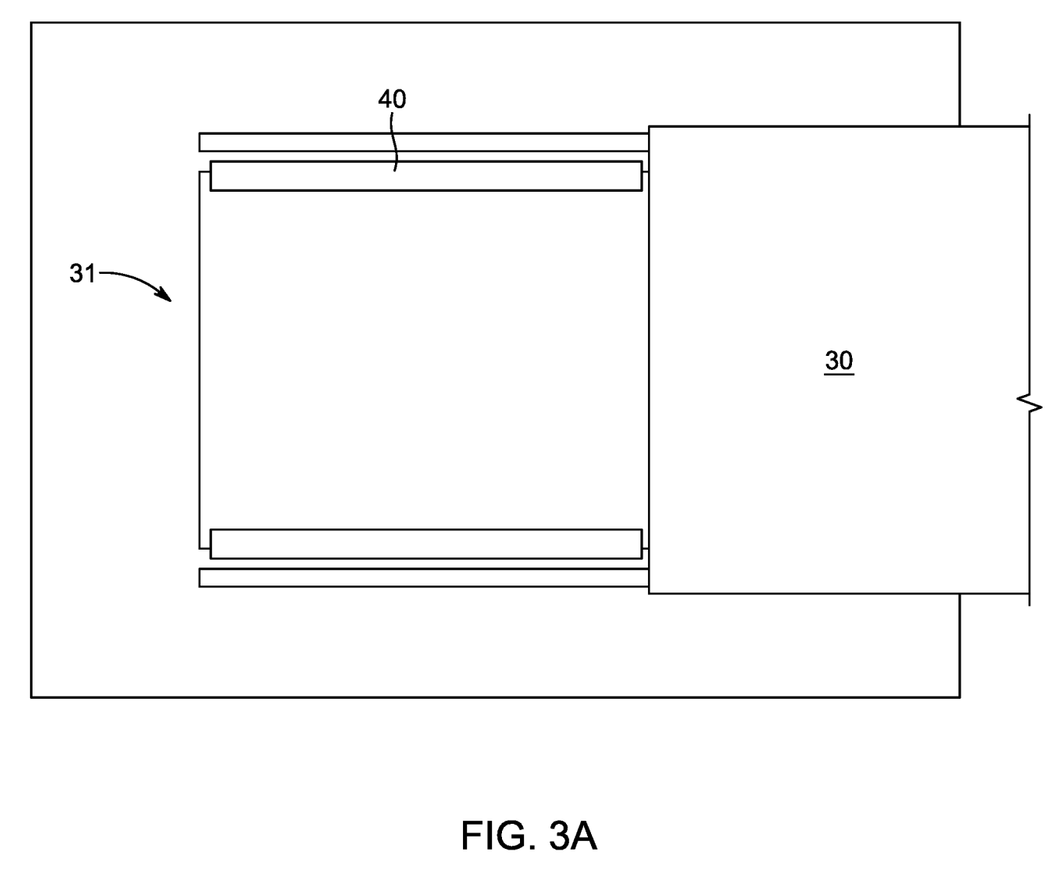
FIG. 3A is a top view of the assisted scanner's scanning unit representing the unit's platen, of assist document holders flanking the platen, and of a special scanner cover carried on rails flanking the document holders, and meanwhile
Figure 3B:
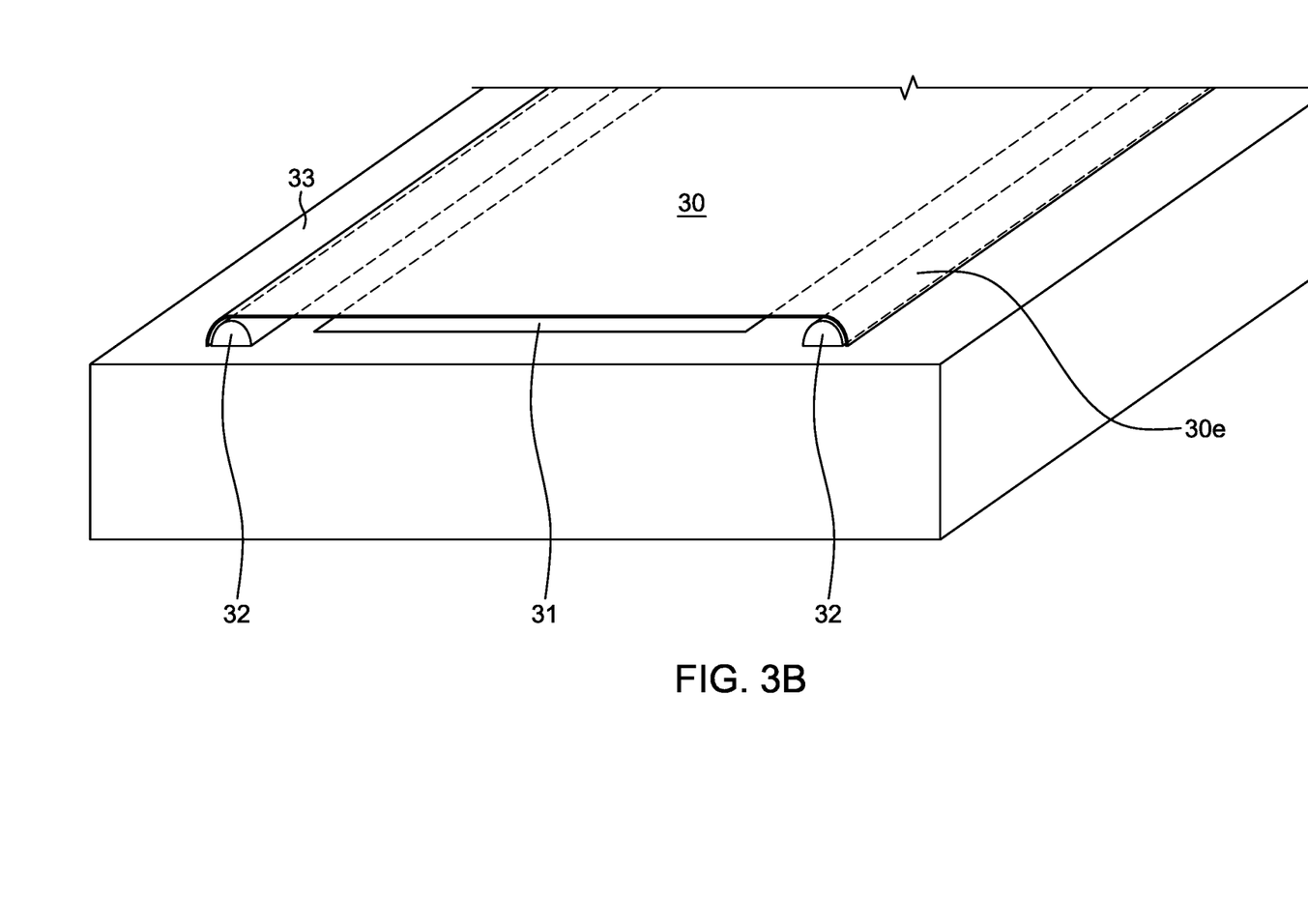
FIG. 3B is an oblique view of an upper portion of the scanning unit, depicting details of the scanner cover and its carriage on the rails.

FIG. 3A illustrates a foot-wieldable scanner cover 30 furnished on the scanning unit 11 of the present disclosure. The scanner cover 30 is slidable on rails 32 flanking the platen glass 31 either longitudinally (lengthwise along the rectangular platen glass 31), as is the case with the implementation illustrated in FIG. 3, or latitudinally (widthwise along the rectangular platen glass 31). The rails 32 may be simple elongated ridges fixed to or integral with a frame 33 retaining the platen-glass. As indicated in FIG. 3B, the exterior-most sides of the rails 32 may be perpendicular to the platen frame 33, and the scanner cover 30 may have simple perpendicular extensions 30e, running along opposing sides of the scanner cover 30, fitting snugly over the rails 32 such as to allow the cover 30 to slide back and forth smoothly along the rails 32. Alternatively, as represented schematically in FIG. 4, the rails 32' may bulge laterally such as to curve into contact with the platen frame 33 and provide a groove where the exterior-most sides of the rails 32' meet the platen frame 33, for retaining a corresponding engaging lip (not shown) along the lower end of each of the perpendicular extensions 30e. It will be appreciated that a "snug fit" herein means sufficient play, e.g. on the order of millimeters, to allow the scanner cover 30 to be slid along the rails 32, but not so much play that the scanner-cover perpendicular extensions 30e knock against the rails 32, disrupting the cover's sliding movement. Likewise, it will be appreciated that sliding "smoothly" herein means able to be slid by the foot, as will be described below, with minimal resistance.

The rails 32 should be of sufficient height to keep the scanner cover 30 from interfering with later-described document-holder arms, motorized hinges on which the document holder arms are mounted, and motorized-hinge drive motors.

The scanner cover 30 may be partially or entirely made of a non-slip material having a high coefficient of friction, so that a hold on the cover 30 may be easily gained with the sole of a user's foot, whether the foot be bare, stockinged/socked, or wearing footwear. Alternatively, to enhance its hold-enabling facility, the scanner cover 30 may be surface-modified by scoring or grooving the outer surface of the cover 30, or providing it with ridges, ribs, nubs, etc., or a friction-grip material may be affixed to the cover's outer surface.

Thus, the scanner cover 30 may be slid off the platen glass 31 by setting the sole of the foot, bare or wearing footwear, on the top of the cover 30, and while putting slight pressure on the cover 30 perpendicularly with respect to the platen glass 31, sliding the foot laterally to drag the cover 30 along the rails 32. There should be stops at common ends of the perpendicular extensions 30e along one of the sides of the scanner cover 30 that is orthogonal to the sides along which the extensions 30e are formed, to keep the cover 30 from being slid off the rails 32 entirely. An arrow or similar marking on the cover 30 could be used to indicate in which direction the cover 30 should be slid off the platen glass 31.

As an alternative to the just-described foot-wieldable scanner cover 30 and slide-enabling cover support structure according to the present disclosure, the scanner cover 30 could be supported on (not-illustrated) bearing slides similar to the drawer ball-bearing slides 20 described hereinabove, but scaled to meet the much smaller size and weight-support requirements of carrying the scanner cover 30. In such implementations, a mechanically or magnetically latching-close, press-to-release mechanism could be employed on the near end of the scanner cover 30 in the direction in which it is closed, to latch shut the cover 30 over the platen glass 31. A mechanically or magnetically latching-open press-to-release mechanism could likewise be employed on the near end of the scanner cover 30 in the direction in which it is opened, to lock in place the cover 30 sliding along the ball-bearing slides under the momentum of having been flicked sideways with the user's foot. The scanner-cover support structure could also be configured to spring-store the energy of being slid open along the slides, and such that the thus-stored energy automatically shuts the scanner cover 30 upon the latching-open press-to-release mechanism being actuated. Alternatively, the opening/closing of the scanner cover 30 as supported on ball-bearing slides could be via voice-actuated servomotors. Such voice actuation will be described later.

Whereas in a conventional scanning device the scanner cover itself retains the to-be-scanned document on the platen glass 31, in the presently described assisted scanner 10 the scanner cover 30 cannot have that function, because the cover 30 has to be laterally slidable off from/onto the platen glass 31. In a conventional scanning device, the scanner cover has a document-retaining pad lining its inner surface. The cover is closed onto a document placed onto the platen, wherein the weight of the scanner cover, enhanced by the spring-loaded hinges that the cover is mounted on, apply force on the pad, which thus holds the document in place. In the presently described assisted scanner 10, with a document set on the platen, sliding an inner-face padded cover back over the platen would dislodge the document.

Since the scanner cover 30 of the assisted scanner 10 cannot itself retain the to-be-scanned document on the platen glass 31, specially configured bar clamps as document holders 40 pivoting on motorized hinges are provided as an aspect of the assisted scanner 10. As will now be described, these document holders 40 assume the function of pressing down on the document to retain it on the platen glass 31.

Figure 4:
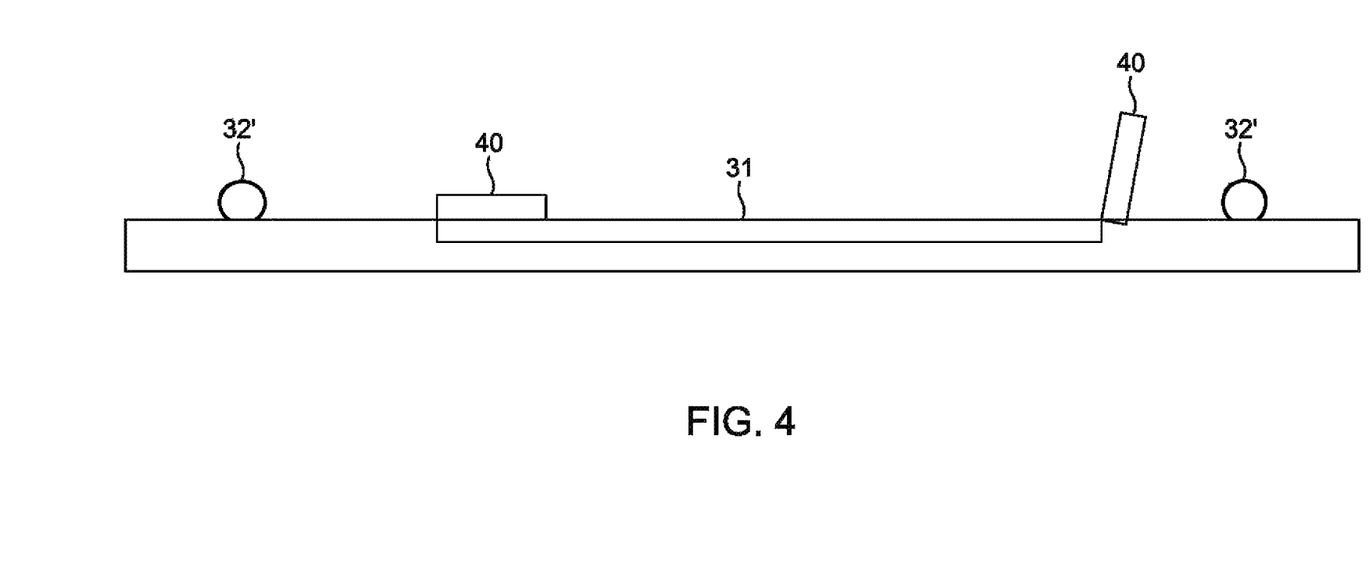
FIG. 4 is a lateral cross-sectional view of the upper portion of the scanning unit, representing in particular, opened and closed states of the document holders.

As indicated in FIGS. 3A and 4, the document holders 40 flank the platen glass 31 along the scanner-cover rails 32, adjoining either longitudinal edge of the platen. It will be appreciated that the document holders 40 could flank the two opposite sides of the platen glass 31 other than the two opposite sides along which the scanner-cover rails 32 are disposed, just as the rails 32 themselves could be disposed along the latitudinal, or shorter, opposite sides of the platen glass 31.

Figure 5A:
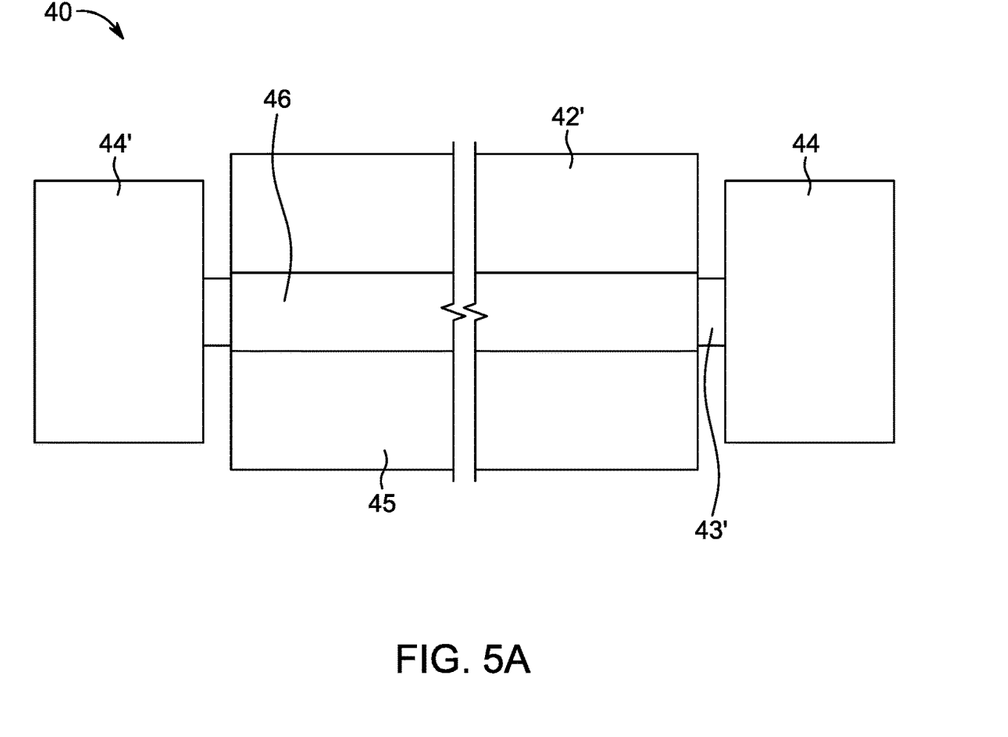
FIG. 5A represents a motorized hinge with which one of the document holders is integral.
Figure 5B:
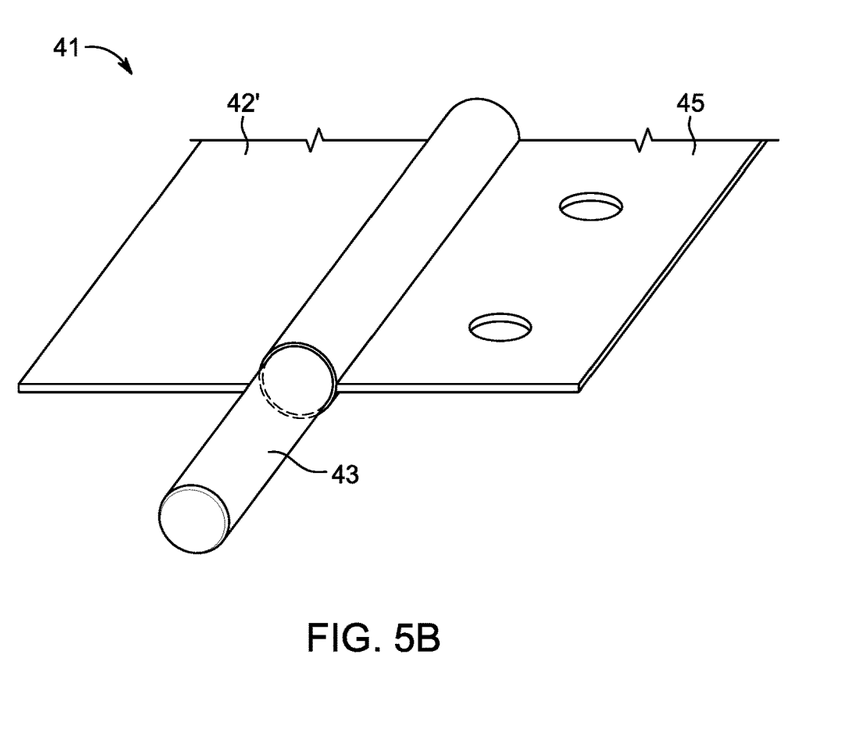
FIG. 5B is an enlarged, fragmentary view showing details of the motorized hinge.
Figure 5C:
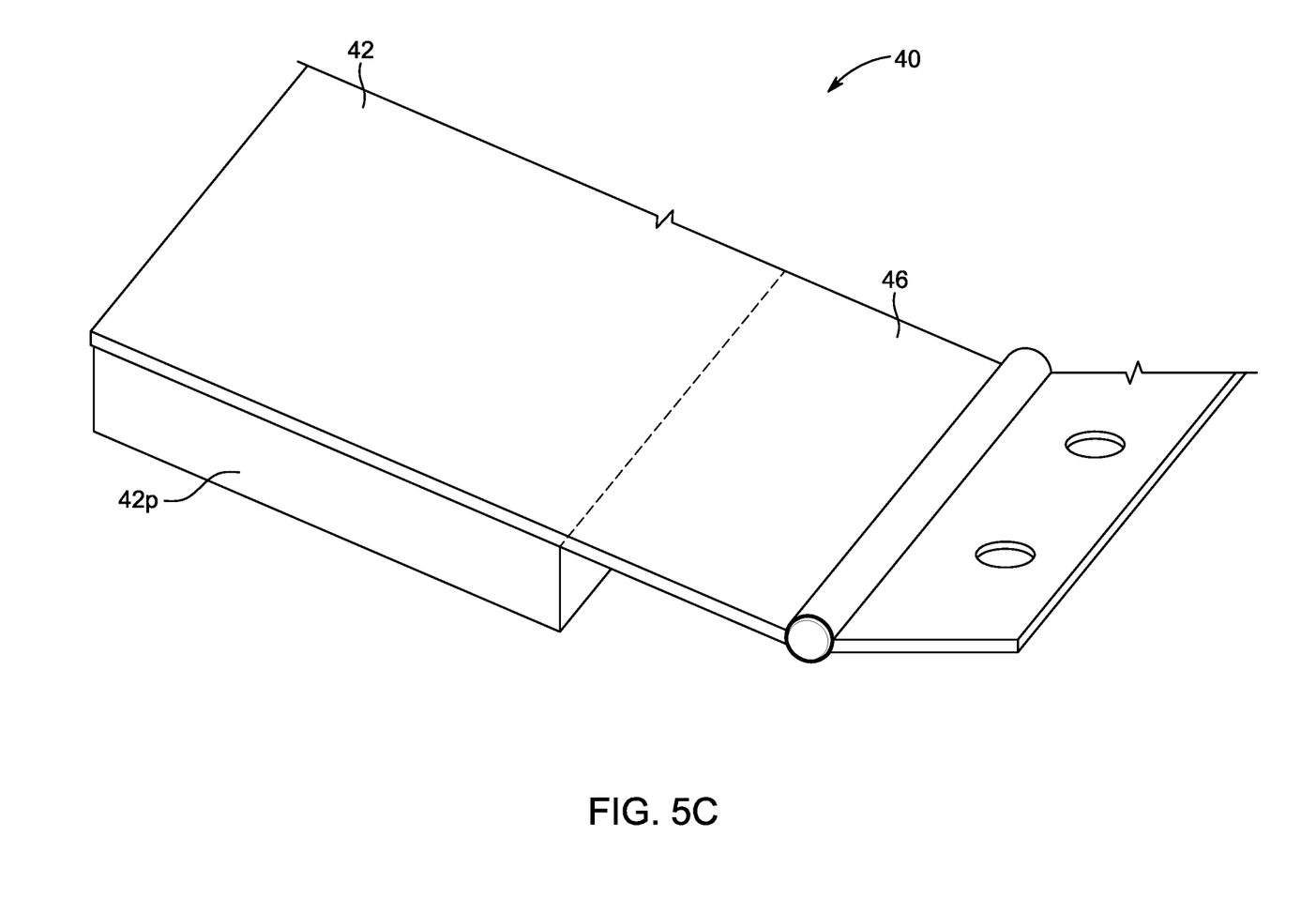
FIG. 5C is an oblique view showing details of the hinge integral with the document holder, in states in which the document holder is opened off of, and closed onto, the platen glass.

Each of the pair of document holders 40 comprises a hinge 41, as illustrated in FIGS. 5A through 5C. At least one of the two hinges 41 is motorized, that is, motor driven. Furthermore, motorizing the hinges 41 either bilaterally or unilaterally is contemplated. Each of the pair of document holders 40 further comprises a document-holder arm 42, and a holder-arm pin 43 extending through the hinge 41. The at least one of the two hinges 41 that is motorized is furnished with a hinge-drive motor 44 whose drive shaft 43' is the holder-arm pin 43 itself or is power-transmissively coupled to one of the opposite ends of the holder-arm pin 43. Hence, the one end of the holder-arm pin 43 is carried in the hinge-drive motor 44, and in implementations where the motor drive is unilateral, the other, non-motor-driven end is held in a bearing retainer and in implementations, as is the case with FIG. 5B, where the motor drive is bilateral, the opposite end of the holder-arm pin 43 is carried in and driven by an identical hinge-drive motor 44'. In implementations where only one of the document holders 40 is motorized, the holder-arm pin 43 in the hinge 41 of the other of the document holders 40 is power-transmissively linked to the drive shaft 43' of the hinge-drive motor 44 for driving the one hinge 41. Such linkage between the hinge-motor's drive shaft 43' and the holder-arm pin 43 of the non-motorized hinge 41 may be a rack-and-pinion coupling configured for opening/closing the other of the pair of document holders 40. From the foregoing explanation, it will be appreciated that the presently disclosed technology comprehends from one to four motors driving the pair of document holders 40.

The hinges 41 are composed of a mounted hinge leaf 45 affixed to the platen frame 33, flanking the neighboring edge of the platen glass 31; a holder-arm leaf 42' either constituting the document-holder arm 42 itself or affixed to a holder-arm mounting portion of the document-holder arm 42; and a hinge knuckle 46 housing the holder-arm pin 43. The holder-arm leaf 42' is fixed to the holder-arm pin 43, such that when the holder-arm pin 43 turns, the holder-arm leaf 42' turns with it. Each of the pair of hinges 41 is mounted on the platen frame 33 in a position where the knuckle 46 portion of the hinge is disposed immediately adjacent, without overlapping, the edge of the platen glass 31.

The mounted hinge leaves 45 of the motorized hinges 41 preferably are of width not greater than the distance between the scanner-cover rail 32 and the neighboring edge of the platen glass 31. Alternatively, in other implementations, each of the two mounted hinge leaves 45 could extend under its scanner-cover rail 32, which in that case would be elevated above platen frame 33 on suitable mounts.

Each of the hinges 41 may be either unilaterally or bilaterally driven (motorized) endwise. In implementations employing a pair of hinge-drive motors 44 each of which is on one of the opposite ends of the motorized hinge 41, at least one of the two hinge-drive motors 44 would have to be power-transmissively coupled to the holder-arm pin 43. The hinge-drive motor 44 is exemplarily a stepper motor, or may be, for example, a servo-controlled servomotor. A motorized hinge 41 of the present disclosure constitutes a voice command device.

The unilateral hinge-drive motor 44, or in alternative implementations the pair of hinge-drive motors 44, clamping the holder-arm pin 43 is mounted on the platen frame 33, and may be accommodated in a motor-cradling recess in the frame 33 so as to reduce the above-surface profile of the hinge-drive motor 44. The hinge-drive motor(s) 44 is electrically connected to control circuitry as part of a below-described voice-user interface (VUI), and to a (not-illustrated) power source.

When the document holders 40 are not being operated, the document-holder arms 42 rest on the platen glass 31, as represented in the left side of FIG. 4. As indicated in FIG. 5C, the underside, platen-contacting surface of the document-holder arms 42 is padded. The padding 42*p* may be a material employed as the pad on the underside of the platen-covering document holder in a conventional MFP, etc. In operation, the hinge-drive motor 44, as a voice command device, is actuated via the control circuitry constituting part of the below-described VUI. Actuation of the hinge-drive motor(s) 44 in each document holder 40 turns the holder-arm pins 43 in the motorized-hinge knuckles 46 through a rotational angle predetermined to open the document-holder arms 42 out, as indicated in the right side of FIG. 4. The document-holder arms 42 are thus opened off the platen glass 31 sufficiently such as not to interfere with the later-described placement of a document onto the platen. Once a document has been placed on the platen glass 31, the hinge-drive motor 44 is actuated by an appropriate voice command to drive the hinge-drive motor 44 in the direction reverse to the holder-arm opening direction. This turns the holder-arm pins 43 back through the rotational angle, and closes the document-holder arms 42 onto the platen glass 31, pressing the holder-arm pads 42*p* against the document to hold it in place for scanning.

Devices, machines, and systems disclosed by the present specification utilize technology that is herein referred to, as aforementioned, a voice user interface, or "VUI." In the present disclosure, VUI encompasses voice-recognition technology including voice-controlled devices, voice-command actuated/activated machines, and the like—any applicable human-machine interface based on voice recognition. For the purposes of the presently disclosed devices, machines, and systems, any known voice-recognition technologies may be utilized; at a minimum, what is required is that the adopted VUI recognize a few simple voice commands to activate or actuate, which may be via a simple on/off control signal, the motorized hinges 41. It will be understood that in some implementations of the presently disclosed technology, in addition to controlling the just-described operation of the document holders 40, VUI is employed to control the extending and/or retracting of the scanner housing-drawer 13, as well as the above-described sliding open/shut of the scanner cover 30.

Figure 6:
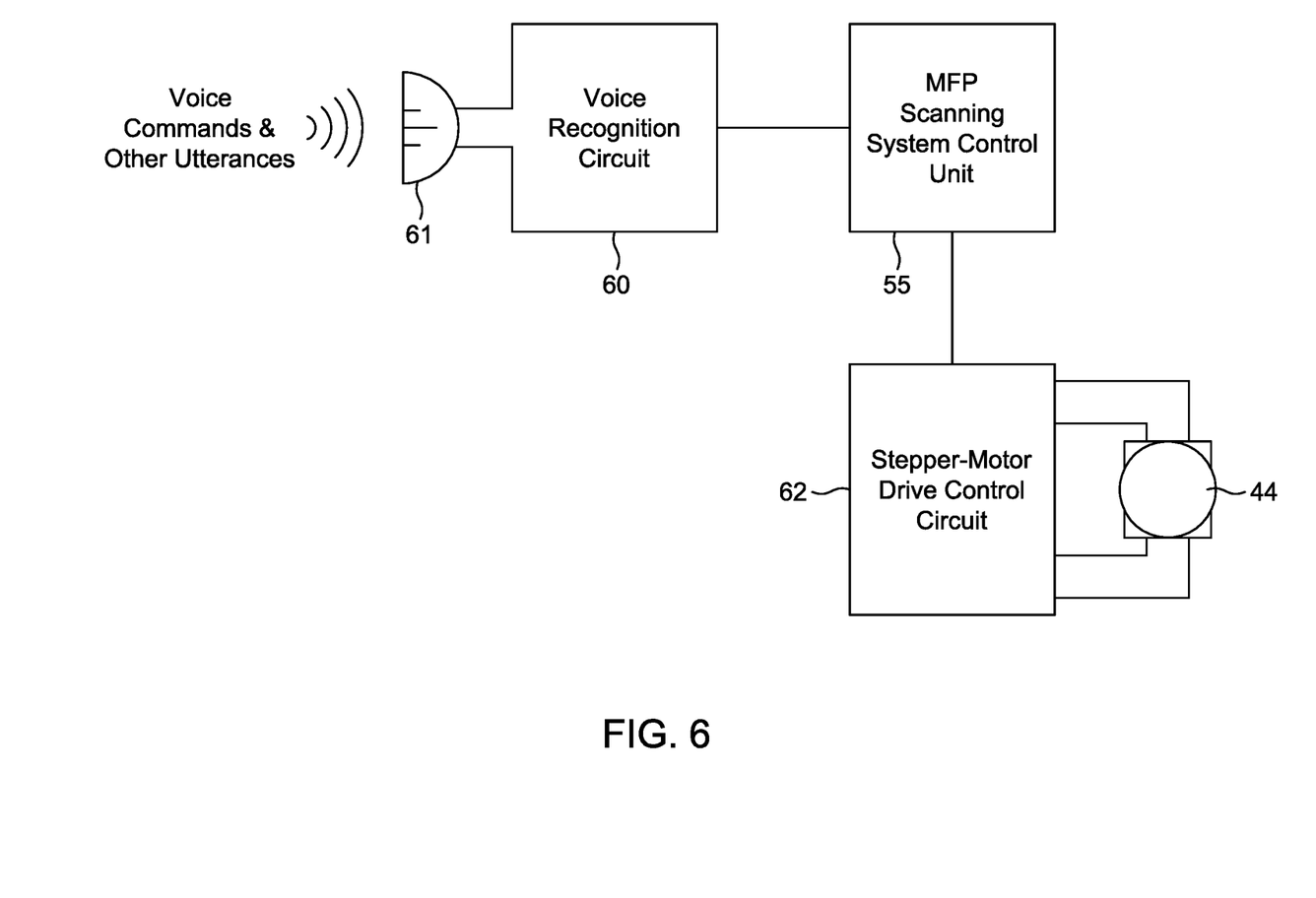
FIG. 6 is a block diagram representing a voice-user interface of the present disclosure.

The block diagram that is FIG. 6 represents a VUI of the present disclosure. The VUI is made up of a microphone 61, a voice recognition circuit 60, a stepper-motor drive-control circuit 62, and the hinge-drive motor(s) 44. The microphone 61 may be installed in a suitable location in an upper lateral surface or top surface of the MFP 50, in which case the microphone 61 is connected by suitable wiring to the scanning unit 11 in the scanner housing-drawer 13 in the bottom of the MFP 50. Alternatively, the microphone 61 may be installed in a suitable location within the scanner housing-drawer 13, provided that the microphone 61 has suitable sensitivity to pick up voice commands from a user speaking from a standing or sitting height with respect to the scanning unit 11 located as it is in the bottom of the MFP 50.

Figure 7:
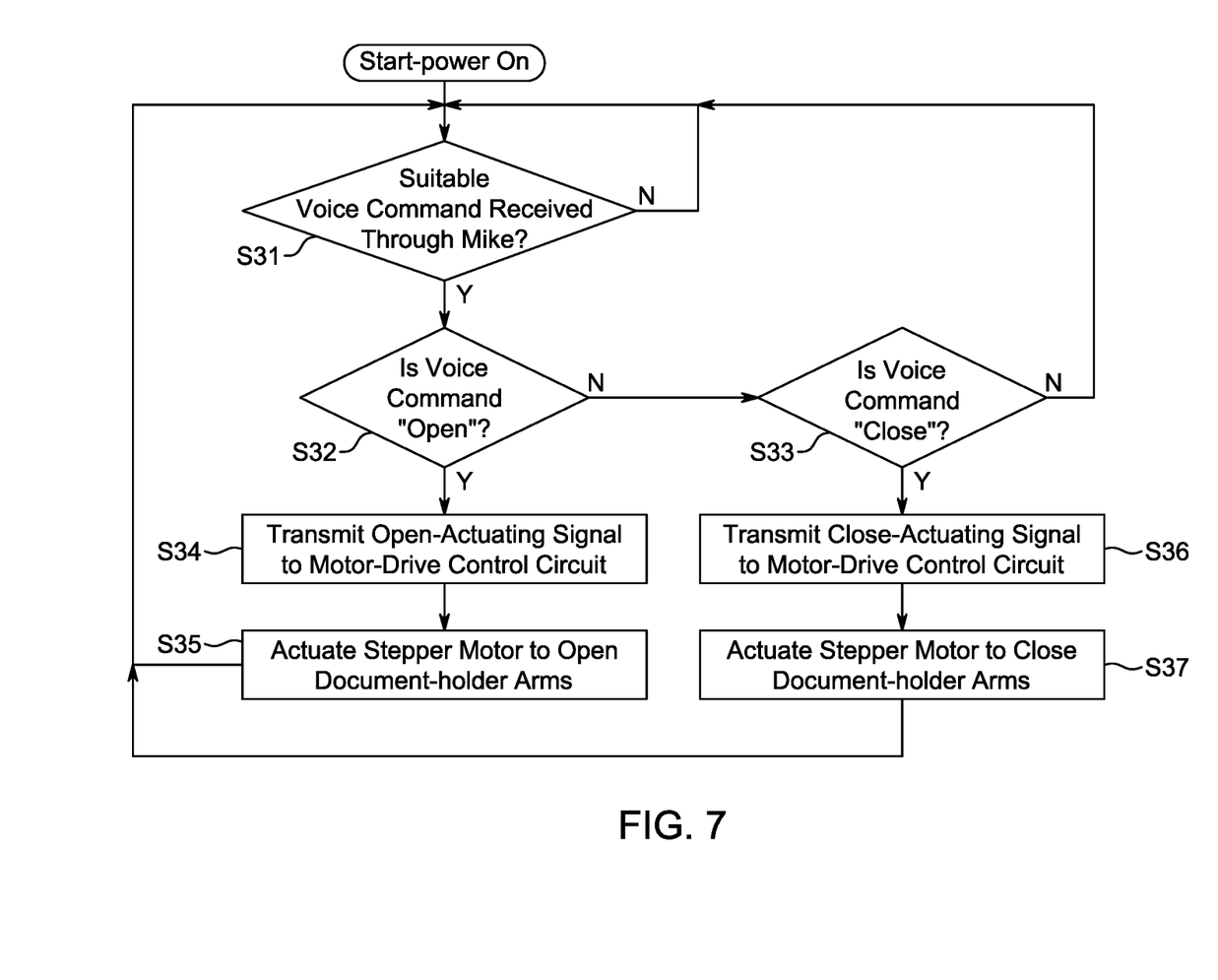
FIG. 7 is a flowchart of a document-holder open/close routine executed by the voice-recognition circuit, and stepper-motor drive-control circuit of FIG. 6.

As illustrated in the FIG. 6 block diagram and the FIG. 7 flowchart, when a user has caused the scanner housing-drawer 13 to extend out from the bottom of the MFP 50 into its use position, in Step S31, the VUI awaits a suitable voice command from the user. In Step S32, the voice recognition circuit 60 determines whether any utterance received through the microphone 61 is a voice command signifying that the document holders 40 are to be opened. If an utterance received through the microphone 61 and sent as a speech signal to the voice recognition circuit 60 is recognized as an open-actuating command, such that the determination at Step S32 is "yes," then in Step S34 the voice recognition circuit 60 sends an open-actuating signal to the stepper-motor drive control circuit 62. In Step S35 the stepper-motor drive control circuit 62 forward-drives the hinge-drive motor(s) 44. The hinge-drive motor(s) 44 thus forward-turns the holder-arm pins 43 in the motorized hinge(s) 41, whereby the document-holder arms 42 open out, off of the platen glass 31.

If in Step S32 the voice recognition circuit 60 determines that an utterance received through the microphone 61 is not a voice command signifying that the document holders 40 are to be opened, in Step S33 the voice recognition circuit 60 confirms that the utterance received through the microphone 61 is a voice command signifying that the document holders 40 are to be closed. If an utterance received through the microphone 61 and sent as a speech signal to the voice recognition circuit 60 is recognized as a close-actuating command, in Step S36 the voice recognition circuit 60 sends a close-actuating signal to the stepper-motor drive control circuit 62. In Step S37 the stepper-motor drive control circuit 62 reverse-drives the hinge-drive motor(s) 44. The hinge-drive motor(s) 44 thus reverse-turns the holder-arm pins 43 in the motorized hinge(s) 41, whereby the document-holder arms 42 close down onto the platen glass 31.

Once a to-be-scanned document is in place and thus held on the platen glass 31, the user closes the scanner cover 30 either by foot-wielding it as described earlier, to slide it along the scanner-cover rails 32 and shut it over the platen, or by using a suitable voice command, in implementations in which the scanner cover 30 is automatically open/closable by being supported on (not-illustrated) ball-bearing slides. It should be understood that the scanner-cover supporting components of such ball-bearing slides could be the rack portion of a rack-and-pinion system whose pinions are driven by (not-illustrated) voice-actuated servomotors. Such voice actuation would be, mutatis mutandis, the analog of the above described stepper-motor voice actuation process. That is, the commands would be open/close commands for, rather than the document holders 40, the servomotors turning the pinions on the ball bearing slide racks. Likewise, the drive control circuit 62 would be configured to drive the servomotors in addition to the hinge-drive motor(s) 44, or otherwise a separate servomotor-dedicated drive-control circuit would be provided. In such implementations of the scanner cover 30, the VUI is connected to the voice actuated servomotors.

With the scanner cover 30 shut, the scanning unit 11 is ready to carry out scanning of the document held on the platen glass 31, as described above. While the scanning operation itself is conventional, the operation is voice-command activated by the above-described VUI. As indicated in FIG. 6, the VUI is connected to a control unit 55 for running the MFP's scanning hardware, which is not illustrated in the figures. The control unit 55 controls a (not-illustrated) scanning drive unit that actuates/halts the document-scanning function of the scanning hardware. The voice actuation process is analogous, mutatis mutandis, to above-described Steps S31 through S33, with the utterances recognized as voice commands being replaced by language signifying starting or stopping of the scanning operation, and with the ensuing Steps S34 or S36 being the actuating or halting of the scanning drive unit.

While the foregoing description of how a scanning unit 11 of the present disclosure is configured to enable the user to place a document on the scanning-unit platen glass 31 may seem to presume the user possesses a given level of agility with the feet—bare, stockinged, or wearing footwear—nonetheless, the presently disclosed technology contemplates an assisted scanning system comprising special wield-assist footwear for assisting the user in placing the documents on the platen glass 31. This wield-assist footwear will now be described.

Figure 8A:
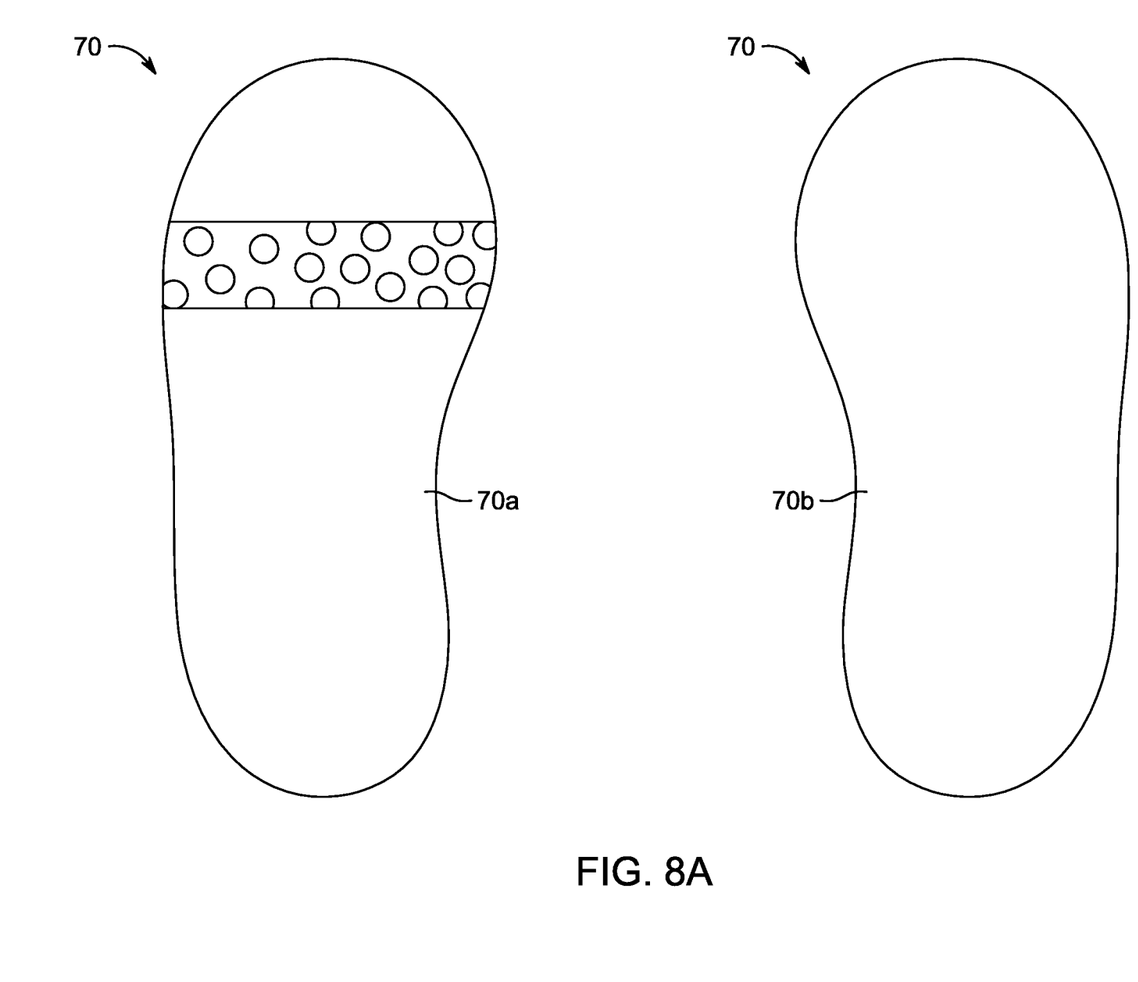
FIGS. 8A and 8B are representative top and bottom views, respectively, of wield-assist footwear for assisted scanning systems of the present disclosure.
Figure 8B:
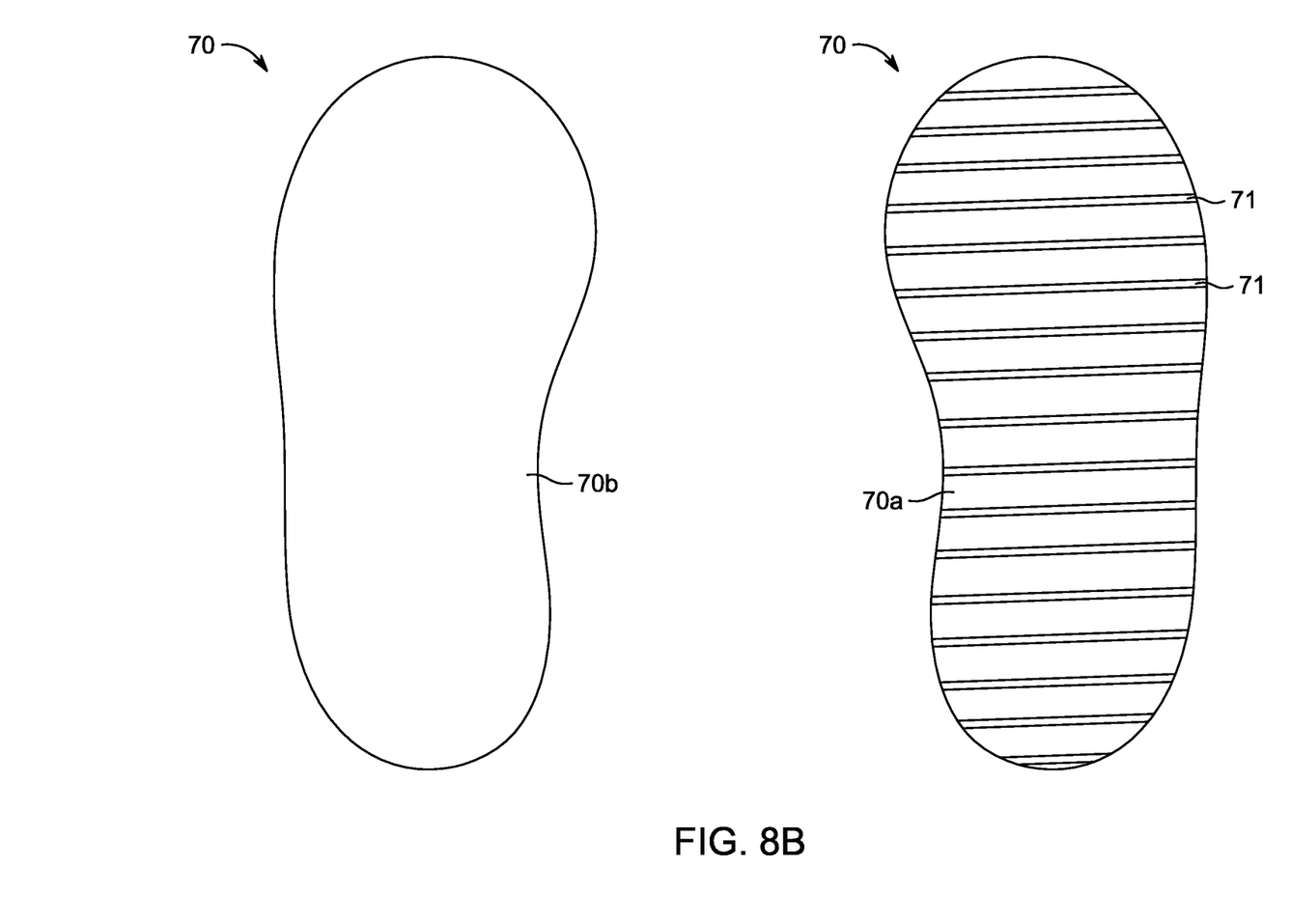

As illustrated in FIGS. 8A and 8B, the wield-assist footwear is embodied as a pair of sandals 70 designed to be easily slipped on the feet. Here, "sandals" is meant to comprehend upper-less shoes provided with thongs that pass between the big and middle toes and anchor to the sole on either side of the foot, or provided with straps going over the top of the foot to retain the shoe comfortably on the foot, as well as slippers with partial or full uppers.

As indicated in FIG. 8A, the wield-assist footwear is especially adapted for assisting the user in wielding a to-be-scanned document. Namely, the sole of one of the sandals—here referred to as the "sticky sandal" 70a—is coated with a low-adhesion, low-tack, removable adhesive ("removable" meaning that the adherence of the sandal sole to an object such as a document is easily breakable, not that the adhesive is easily removable from the sole). The adhesive may be any known type of re-adherable pressure-sensitive adhesive. The coating of the re-adherable pressure-sensitive adhesive may be over the entirety of the bottom of the sole, over a select portion of the bottom, or patterned in, for example, stripes on the bottom. The companion, non-sticky sandal 70b to the sticky sandal 70a has a conventional sole whose bottom is not coated with an adhesive.

Using the sticky-non-sticky sandal pair 70 to wield a to-be-scanned document using an assisted scanning system of the present disclosure is a bipedal operation. Namely, having slipped on the wield-assist footwear, the user at first utilizes the sticky sandal 70a to get hold of a document that the user wishes to scan, by lightly treading on the upturned side of the document with the foot wearing the sticky sandal 70a. Next, the user sandaled-foot-transfers the document to the platen glass 31, where the user has voice-commanded the document-holder arms 42 into their open position swung off the platen glass 31, and lightly sets the document-holding sticky sandal 70a on the platen. The user may thereupon twist the foot as necessary to position the document properly in place on the platen glass 31. At this point, the user then employs the non-sticky sandal 70b: The user brings the foot wearing the non-sticky sandal 70b next to the sticky sandal 70a resting on the document now set on the platen glass 31, presses the non-sticky sandal 70b down lightly on the document, and lifts the sticky sandal 70a off the document. Thus, in this bipedal operation, the non-sticky sandal 70b serves as a counterbalance to the force acting on the placed document from the user pulling the sticky sandal 70a off it.

It will be appreciated that this operation would also serve to enable the user to take a document sheet off a stack, or to open a document-containing folder and take out a given page from the folder.

With the document thus placed on the platen glass 31, the user takes the foot wearing the non-sticky sandal 70b off the document and issues a voice command to initiate the process detailed earlier in the description of Step S33 of the document holder 40 open/close routine, thereby to close the document-holder arms 42 down onto the document. The user then slides the scanner cover 30 shut with the foot, in the above-described implementations in which the cover 30 is configured to be slid open/shut by the user; or the user issues a voice command to have the cover 30 slide shut automatically, in the above-described implementations in which the scanner cover 30 is configured to be slid automatically open/closable via a VUI.

Once the document has been scanned by the scanning operation voice-command activated as described above, in scanning-unit implementations in which the scanner cover 30 is foot-slid open/shut, the user slides the scanner cover 30 open with the foot. Otherwise, in scanning-unit implementations in which the scanner cover 30 is automatically open/closable, the user issues a voice command to have the cover 30 slide open automatically. With the scanner cover 30 slid open, the user then issues a voice command to initiate the process detailed earlier in the description of Step S32 of the document holder 40 open/close routine, thereby to open the document-holder arms 42 off of the document. With the scanning operation thus completed, the user again utilizes the wield-assist footwear, this time to lift the document off the platen with the sticky sandal 70a and, using the bipedal operation involving the counterbalancing with the non-sticky sandal 70b, return the document to its place.

As indicated in FIG. 8A, the top side of at least one of the sandals may be marked or patterned to visually distinguish the sticky 70a from the non-sticky 70b sandal. The thus-marked sandals 70—which may be identical such as not to be left-right distinguishing in form—assist the user in distinguishing the sticky 70a from the non-sticky 70b sandal.

The re-adherable pressure-sensitive adhesive on the sole of the sticky sandal 70a may be replenishable, such that wield-assist footwear of a presently disclosed assisted scanning system comprising such footwear may be packaged with a supply of re-adherable pressure-sensitive adhesive that may be brushed on the sole, or is in the form of, for example, strips that may be applied to the sole. If the re-adherable pressure-sensitive adhesive is in brush-on form, the sole may be formed with ribs or ridges 71, as indicated in FIG. 8B, to aid in the holding of the adhesive to the sole.

It should be understood that the aforementioned VUIs for scanning units and assisted scanning systems according to the present disclosure may be configured such that the commands that effect voice control via the VUI amount to a minimal, limited vocabulary. On the other hand, a VUI in some implementations of the presently disclosed technology may exploit voice-recognition software having the capacity to recognize a variety of command permutations, as well as voice-recognition software having the capacity to recognize a wide range of pronunciations, durations, modulations, etc. of either a minimal vocabulary or a vocabulary including various, semantically related permutations of a set of commands.

It will be appreciated that assisted scanners of the present disclosure may be furnished as auxiliary devices in MFPs with conventional scanning devices in the upper part of the apparatus, including scanning devices that enable automatic document feeding.

The inventor of the presently disclosed technology contemplates the technology's application to greatly improve productivity in a business process outsourcing setting. For example, if a user who is the subject of the presently disclosed technology is working in a setting where many documents are being digitized and a document happens to not get scanned correctly, such user is enabled to (re)scan the document independently.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. An assisted scanner comprising:
    a boxlike scanning-unit frame having substantially rectangular lateral sides;
    a scanning unit mounted in the scanning-unit frame, the scanning unit including
        a platen frame constituting a scanning-surface side of the scanning unit,
        a platen glass retained in the platen frame,
        scanner-cover retaining rails mounted on the platen frame along opposing sides of the platen glass,
        a scanner cover slidably retained on the scanner-cover retaining rails,
        a pair of document holders flanking the platen glass between opposing sides of the platen glass and the scanner-cover retaining rails, the pair of document holders including
            a pair of document-holder arms, and
            a pair of hinges carrying the document-holder arms and being motorized to open the document-holder arms off of, and close document-holder arms onto, the platen frame, and
        scanning hardware housed in the scanning-unit frame beneath the platen glass;
    a scanning-hardware control unit for controlling the scanning hardware; and
    a voice-user interface operatively connected to the motorized hinges and to the scanning-hardware control unit.

2. An assisted scanner as set forth in claim 1, wherein the pair of document holders further includes:
    a pair of holder-arm pins each extending through a corresponding one of the pair of hinges; and
    a hinge-drive motor having a drive shaft either constituting, or power-transmissively coupled to, the holder-arm pin of one of the motorized hinges; wherein
    each hinge is composed of a mounted hinge leaf affixed to the platen frame, a holder-arm leaf fixed to one of the holder-arm pins and either constituting the document-holder arm itself or affixed to a holder-arm mounting portion of the holder-arm leaf, and a hinge knuckle housing the one of the holder-arm pins.

3. An assisted scanner as set forth in claim 1, wherein the scanning-unit frame retains the scanning unit tilted at an acute angle with respect to the scanning-unit frame's substantially rectangular lateral sides.

4. An assisted scanner as set forth in claim 1, wherein the scanner cover is either partially or entirely made of a non-slip material having a high coefficient of friction.

5. An assisted scanner as set forth in claim 1, wherein the scanner cover is outer-surface-modified to provide the scanner cover's outer surface with an enhanced hold-enabling facility.

6. A multifunction peripheral comprising:
    an extensible and retractable scanner housing-drawer carried on ball-bearing slides provided in a bottom frame of the multifunction peripheral; and
    an assisted scanner, housed in the scanner housing-drawer, the assisted scanner including
        a boxlike scanning-unit frame having substantially rectangular lateral sides,
        a scanning unit mounted in the scanning-unit frame, the scanning unit including
            a platen frame constituting a scanning-surface side of the scanning unit,
            a platen glass retained in the platen frame,
            scanner-cover retaining rails mounted on the platen frame along opposing sides of the platen glass,
            a scanner cover slidably retained on the scanner-cover retaining rails,
            a pair of document holders flanking the platen glass between opposing sides of the platen glass and the scanner-cover retaining rails, the pair of document holders including
                a pair of document-holder arms, and
                a pair of hinges carrying the document-holder arms and being motorized to open the document-holder arms off of, and close document-holder arms onto, the platen frame, and
        scanning hardware housed in the scanning-unit frame beneath the platen glass,
        a scanning-hardware control unit for controlling the scanning hardware, and
        a voice-user interface operatively connected to the motorized hinges and to the scanning-hardware control unit; wherein
    the voice-user interface includes a microphone installed in an upper portion of the multifunction peripheral and operatively connected to the voice-user interface.

7. A multifunction peripheral as set forth in claim 6, wherein the pair of document holders further includes:
    a pair of holder-arm pins each extending through a corresponding one of the pair of hinges; and
    a hinge-drive motor having a drive shaft either constituting, or power-transmissively coupled to, the holder-arm pin of one of the motorized hinges; wherein
    each hinge is composed of a mounted hinge leaf affixed to the platen frame, a holder-arm leaf fixed to one of the holder-arm pins and either constituting the document-holder arm itself or affixed to a holder-arm mounting portion of the holder-arm leaf, and a hinge knuckle housing the one of the holder-arm pins.

8. A multifunction peripheral as set forth in claim 6, wherein the scanning-unit frame retains the scanning unit tilted at an acute angle with respect to the scanning-unit frame's substantially rectangular lateral sides.

9. A multifunction peripheral as set forth in claim 6, wherein the scanner housing-drawer is semiautomatically extensible and retractable.

10. A multifunction peripheral as set forth in claim 6, wherein:
- the scanner housing-drawer is automatically extensible and retractable and
- the voice-user interface is operatively connected to the scanner housing-drawer.

11. An assisted scanning system comprising:
a multifunction peripheral including
- an extensible and retractable scanner housing-drawer carried on ball-bearing slides provided in a bottom frame of the multifunction peripheral; and
- an assisted scanner, housed in the scanner housing-drawer, the assisted scanner including
    - a boxlike scanning-unit frame having substantially rectangular lateral sides,
    - a scanning unit mounted in the scanning-unit frame, the scanning unit including
        - a platen frame constituting a scanning-surface side of the scanning unit,
        - a platen glass retained in the platen frame,
        - scanner-cover retaining rails mounted on the platen frame along opposing sides of the platen glass,
        - a scanner cover slidably retained on the scanner-cover retaining rails,
        - a pair of document holders flanking the platen glass between opposing sides of the platen glass and the scanner-cover retaining rails, the pair of document holders including
            - a pair of document-holder arms, and
            - a pair of hinges carrying the document-holder arms and being motorized to open the document-holder arms off of, and close document-holder arms onto, the platen frame, and
    - scanning hardware housed in the scanning-unit frame beneath the platen glass,
    - a scanning-hardware control unit for controlling the scanning hardware, and
    - a voice-user interface operatively connected to the motorized hinges and to the scanning-hardware control unit, wherein the voice-user interface includes a microphone installed in an upper portion of the multifunction peripheral and operatively connected to the voice-user interface; and
wield-assist footwear constituted by a sticky sandal whose sole is coated with a low-adhesion, low-tack, removable adhesive, and a non-sticky sandal.

12. An assisted scanning system as set forth in claim 11, wherein the pair of document holders further includes:
- a pair of holder-arm pins each extending through a corresponding one of the pair of hinges; and
- a hinge-drive motor having a drive shaft either constituting, or power-transmissively coupled to, the holder-arm pin of one of the motorized hinges; wherein
- each hinge is composed of a mounted hinge leaf affixed to the platen frame, a holder-arm leaf fixed to one of the holder-arm pins and either constituting the document-holder arm itself or affixed to a holder-arm mounting portion of the holder-arm leaf, and a hinge knuckle housing the one of the holder-arm pins.

13. An assisted scanning system as set forth in claim 12, wherein the top of either or both the sticky sandal and the non-sticky sandal is marked or patterned to visually distinguish the sticky from the non-sticky sandal.

14. An assisted scanning system as set forth in claim 11, wherein the scanning-unit frame retains the scanning unit tilted at an acute angle with respect to the scanning-unit frame's substantially rectangular lateral sides.

15. An assisted scanning system as set forth in claim 14, wherein the top of either or both the sticky sandal and the non-sticky sandal is marked or patterned to visually distinguish the sticky from the non-sticky sandal.

\* \* \* \* \*